Oct. 4, 1966 E. R. DOUBEK, JR 3,277,281

COUNTER FOR REDUCING COUNTING ERRORS CAUSED BY OVER-AND UNDERCOUNTS IN A RECORD CONVERSION SYSTEM

Filed May 8, 1962 6 Sheets-Sheet 1

INVENTOR
E. R. DOUBEK, JR.

BY J. M. Presson
ATTORNEY

INVENTOR
E. R. DOUBEK, JR.
BY Jm Presson
ATTORNEY

Oct. 4, 1966 E. R. DOUBEK, JR 3,277,281

COUNTER FOR REDUCING COUNTING ERRORS CAUSED BY OVER-AND UNDERCOUNTS IN A RECORD CONVERSION SYSTEM

Filed May 8, 1962 6 Sheets-Sheet 3

INVENTOR
E. R. DOUBEK, JR

BY J. M. Presson
ATTORNEY

INVENTOR
E. R. DOUBEK, JR
BY [signature]
ATTORNEY

Oct. 4, 1966 E. R. DOUBEK, JR 3,277,281

COUNTER FOR REDUCING COUNTING ERRORS CAUSED BY OVER-AND UNDERCOUNTS IN A RECORD CONVERSION SYSTEM

Filed May 8, 1962 6 Sheets-Sheet 5

INVENTOR
E.R. DOUBEK, JR
BY Jm Presson
ATTORNEY

Oct. 4, 1966 E. R. DOUBEK, JR 3,277,281

COUNTER FOR REDUCING COUNTING ERRORS CAUSED BY OVER-AND UNDERCOUNTS IN A RECORD CONVERSION SYSTEM

Filed May 8, 1962 6 Sheets-Sheet 6

VOLTAGE SIGNALS AT TERMINALS $T_1$-$T_4$ IN COUNTING CIRCUIT

INVENTOR
E.R. DOUBEK, JR.

BY Jim Presson

ATTORNEY

United States Patent Office 3,277,281

Patented Oct. 4, 1966

3,277,281
COUNTER FOR REDUCING COUNTING ERRORS CAUSED BY OVER- AND UNDERCOUNTS IN A RECORD CONVERSION SYSTEM

Edward R. Doubek, Jr., Brookfield, Ill., assignor to Western Electric Company, Incorporated, New York, N.Y., a corporation of New York Filed May 8, 1962, Ser. No. 193,199
11 Claims. (Cl. 235—61.1)

This invention relates generally to a system for and method of reading and transcribing records from one medium onto a different medium, and more specifically to a magnetic tape-to-card or magnetic tape-to-paper tape conversion system and method which effectively reduces counting errors created by imperfect data input signals.

Punched paper cards and punched paper tapes are utilized to control the operations of machines and processes. In accordance with conventional practice, the required control information is recorded on a magnetic tape by a computer coupled to a tape transport or recorder in the form of discrete, incremental magnetized bits of information. A record conversion system is thereafter employed to transcribe the incremental bits, hereinafter referred to as data bits, to coded information in the form of rows of permutations of holes in a paper tape or paper card medium, the paper tape or card medium, for example, being thereafter used to automatically control the sequence of processes or machine operations. By converting long channels of data bits from a magnetic tape to punched holes in a paper tape or card, large numbers of groups of magnetic pulses may ordinarily be transcribed as many times as needed on relatively short lengths of inexpensive paper medium.

Existing record conversion systems read groups of data bits recorded in single or plural information channels on the magnetic tape, and thereafter count in binary code form the number of separate data bits forming the complete records of information in each channel. Interrecord gaps are provided by the computer to separate and distinguish between various records of data bits. The count is accumulated by the record conversion system during the reading period and when the entire record of information has been read, the conversion system selectively energizes one or more of a series of punches which punch a row of permutations of holes into the paper medium, the position of the holes in each row representing in code form the number of data bits in the particular magnetic record.

In the production of the magnetic tape, the computer into which information is read magnetizes one or more channels on the magnetic tape in accordance with information received, and the read and playback heads of the conversion system convert the magnetized increments in each channel into electrical pulses, the number of pulses being determined by the number of magnetized increments on the magnetic tape. Theoretically, the data pulses from the read head of the record conversion system should assume a sinusoidal or square wave form and would appear symmetrical if observed through an oscilloscope connected to the output terminals of the conversion system.

It has been observed, however, that non-information based flux changes appear at the beginning and end of the wave form. Those working in the art will be cognizant of the fact that by using narrow band, highly selective types of read heads and sophisticated playback circuits, and by maintaining the speed of the magnetic tape constant, such signals can usually be filtered out before being impressed to the counter stages. However, it will also be appreciated that narrow channel, computer quality, read heads and associated playback circuits not only require constant operating speeds but are also considerably more expensive than audio quality, wide channel, reading heads and thus with these considerations involved, it may be more feasible to use wide band read heads.

When the latter type of read heads are employed, it was discovered that oftentimes the amplitude of these non-information based signals is exaggerated by the preamplifiers in the reading and playback heads and such spurious signals may be read as data pulses by the conversion system. Consequently, it is not unusual to have spurious overcounts of from one to two data bits produced by commercially available wide band reading heads.

It is broadly an object of this invention to provide a record conversion system and a method for effectively reducing counting errors created by overcounts or undercounts resulting from imperfect input pulses supplied to the system.

More specifically, it is an object of this invention to provide a record conversion system including a binary counter incorporating one or more buffer stages that will absorb overcounts and undercounts created by imperfect input data pulses.

Another object of this invention is to provide a record conversion system responsive to interrecord gaps in the magnetic tape to reset the counter stages of the system.

Still another object of this invention is to provide an indicating system for interrogating the buffer stage or stages in the counter of the record converter system in order to ascertain the presence of overcounts or undercounts in the buffer stage or stages.

It is an additional object of this invention to provide a circuit capable of detecting gaps between variable length records, the circuit responding to such interrecord gaps to trigger the paper punches and reset the counting stages.

According to the method of this invention, the number of spurious overcounts and undercounts that result from the conversion by a particular recorder of a single number of magnetized records are counted by binary counting stages. The overcounts and undercounts are plotted so that the probability of a certain number of such counts occurring from the conversion of any record by the recorder can be ascertained. At least one stage may be added to the binary counting stages for absorbing the required number of overcounts and undercounts whereby the desired accuracy of count in the counting stages is attained, the computer which produces the magnetized records being reprogrammed to compensate for the absorption of such counts.

In order to effect the foregoing method, a record conversion system is provided which incorporates at least one buffer flip-flop stage ahead of the binary counter stages, the buffer stage absorbing counting errors produced by imperfect input data pulses. All data pulses appearing between the interrecord gaps of the magnetic tape record are counted as data bits by the binary counting stages and considered as one complete record. After the last data bit in any record is counted, an electrical pulse is generated by a circuit in the conversion system causing certain of the paper punches to be energized to punch a complete record into the paper medium in accordance with the conditioning thereof by the counting stages. A predetermined period of time thereafter prior to the receipt of another record, the counting stages are reset.

Other objects, advantages and novel aspects of the invention will become apparent upon reference to the following detailed description, taken in conjunction with the appended drawings, in which.

Figures 3, 4, 5, 6:
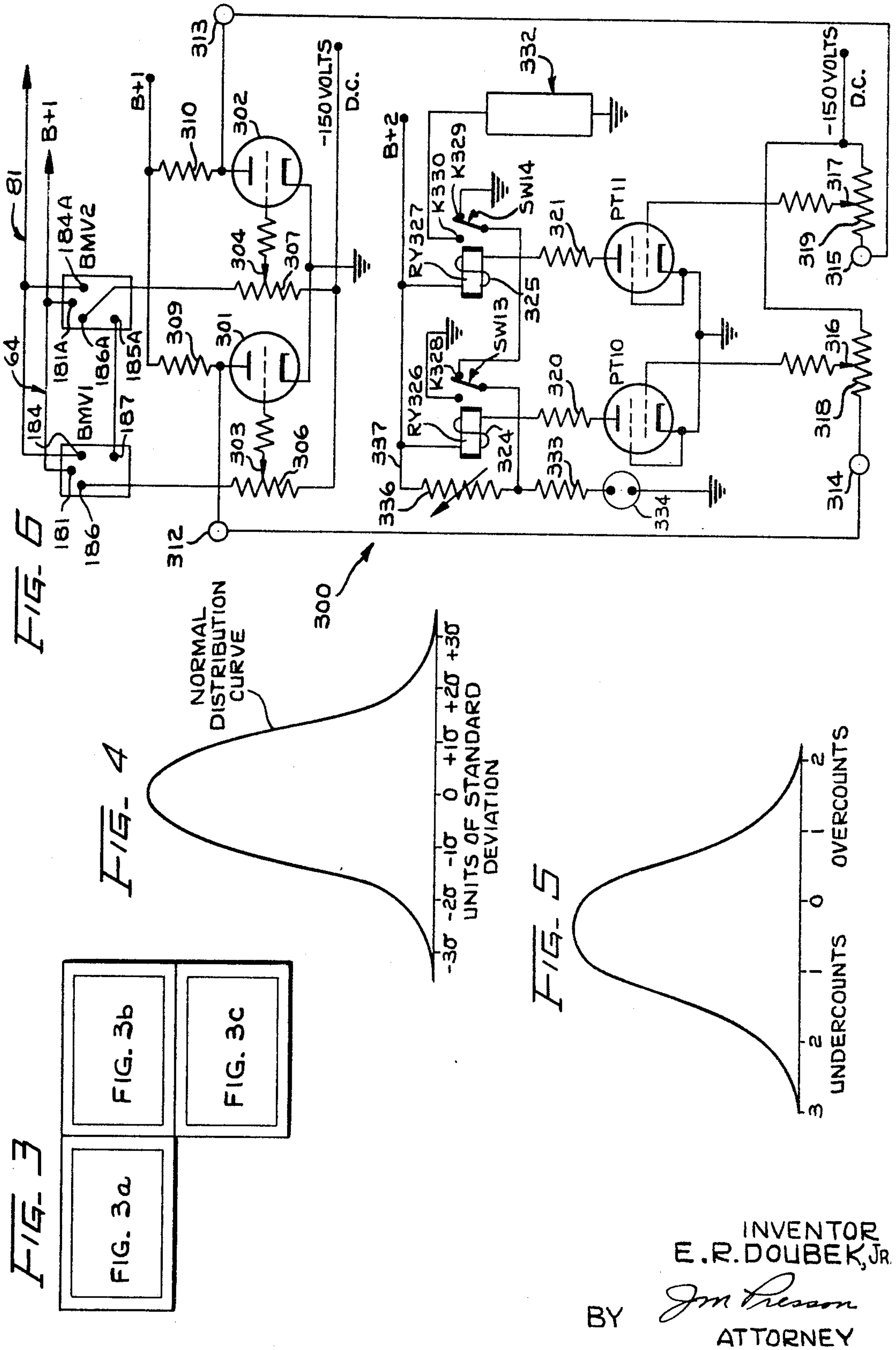
FIG. 3 is a composite view of FIGS, 3*a*, 3*b* and 3*c* showing the relationship between the circuits illustrated in those figures.
Figure 3A:
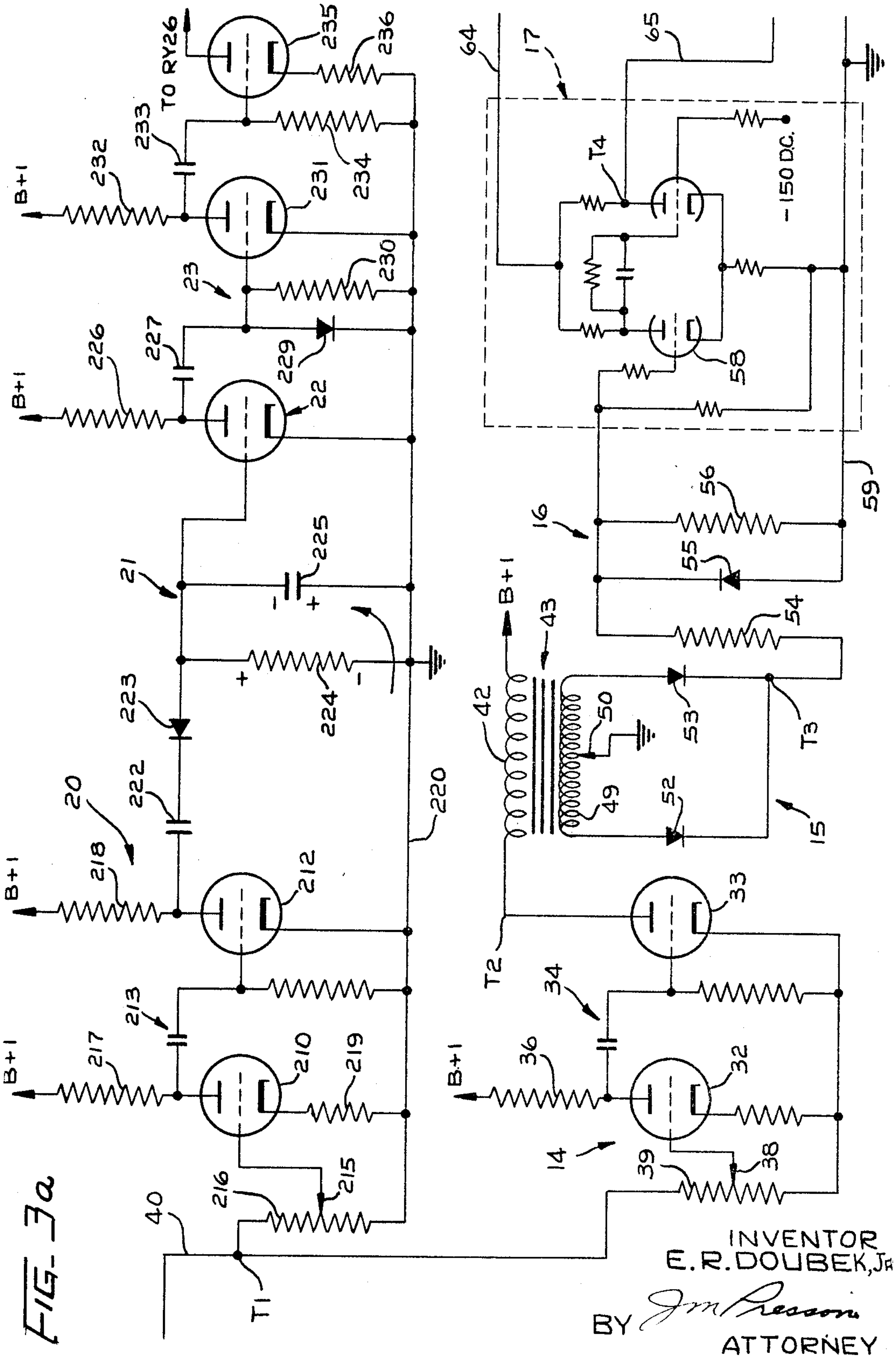
Figure 3B:
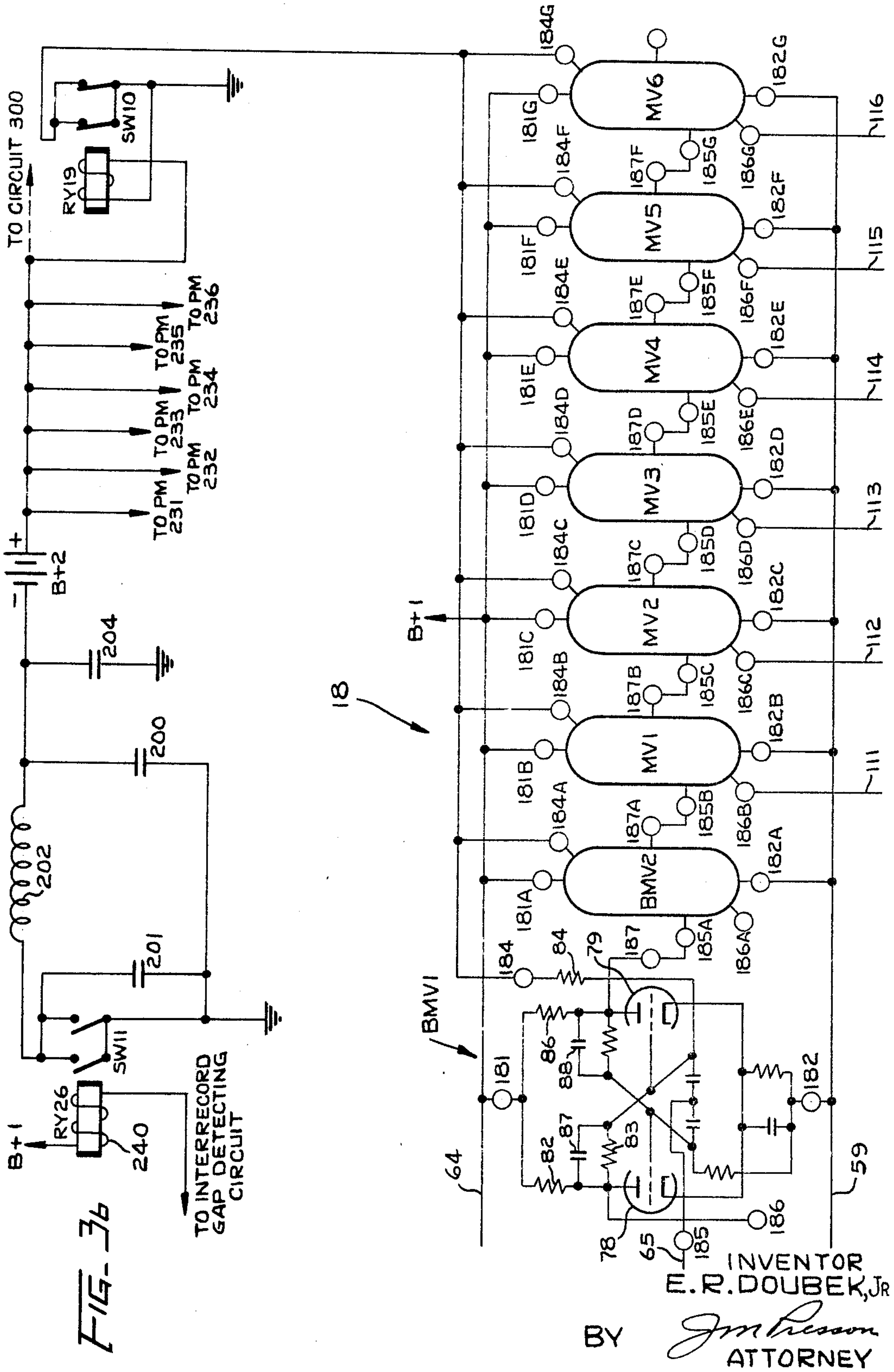
Figure 3C:
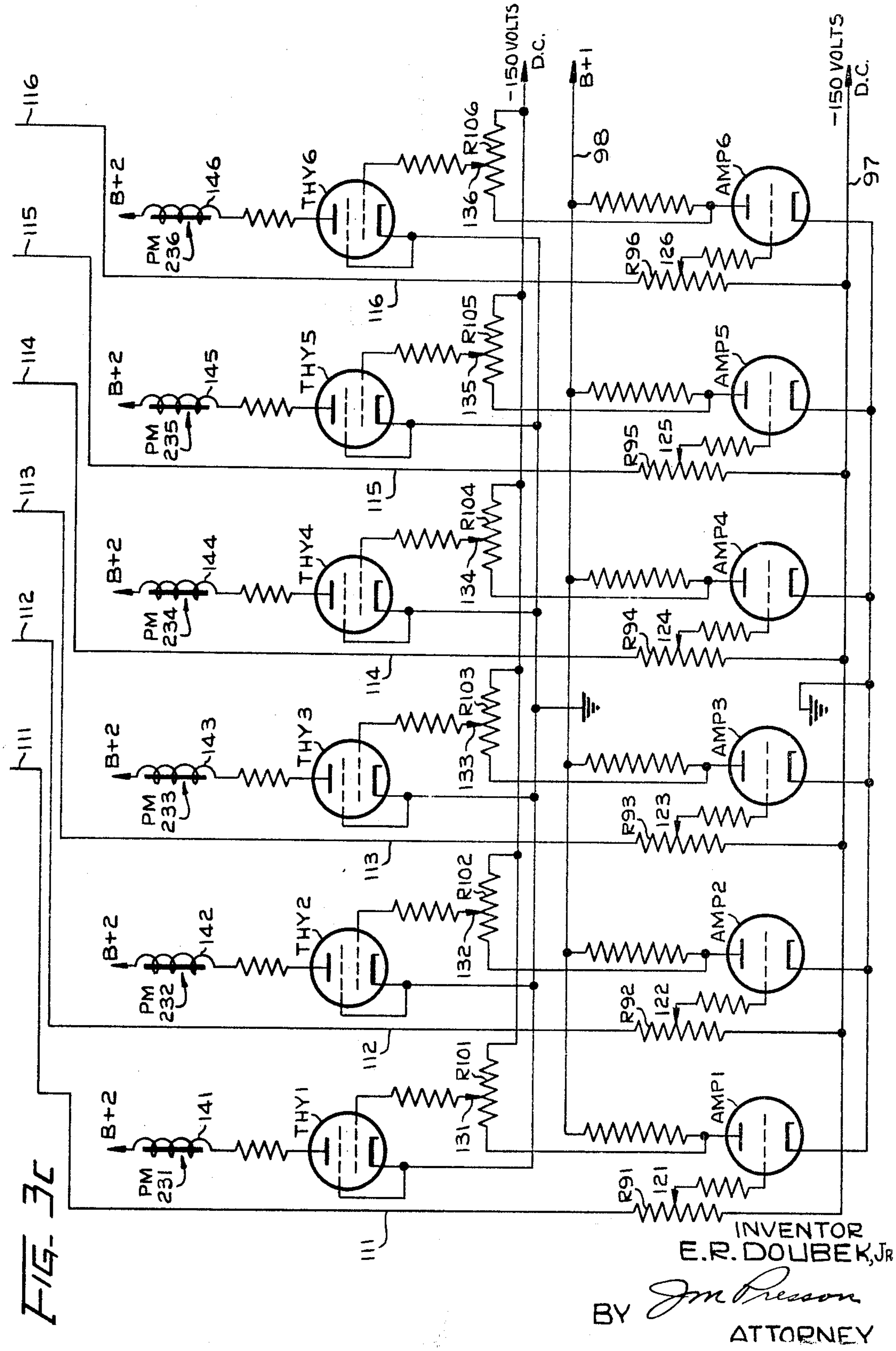
Figure 8:
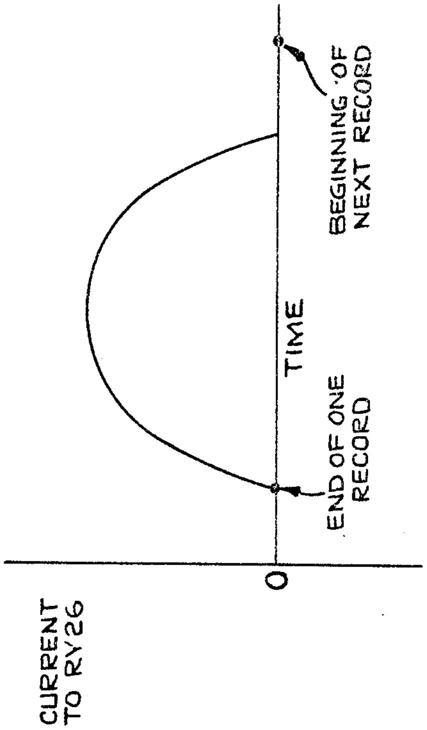
Figure 7:
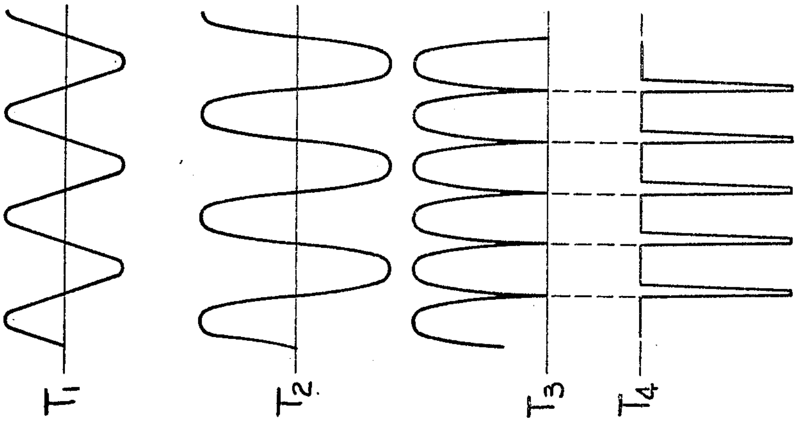

FIG. 3*a* illustrates in detail a portion of the interrecord gap detecting circuit and a portion of the counting circuit;

FIG. 3*b* illustrates the remaining portion of the circuit shown in FIG. 3*a*;

FIG. 3*c* illustrates the circuit for the punch magnets;

FIG. 4 shows a typical normal distribution curve;

FIG. 5 shows a typical distribution curve of overcounts and undercounts;

FIG. 6 illustrates a circuit for counting the number of records having neither an overcount nor an undercount therein;

FIG. 7 shows the character of the wave forms at four selected terminals in the binary counting circuit; and FIG. 8 illustrates the wave form of the current supplied to the relay circuit from the interrecord gap detecting circuit.

*Brief statement of functional operation*

Figures 1, 2:
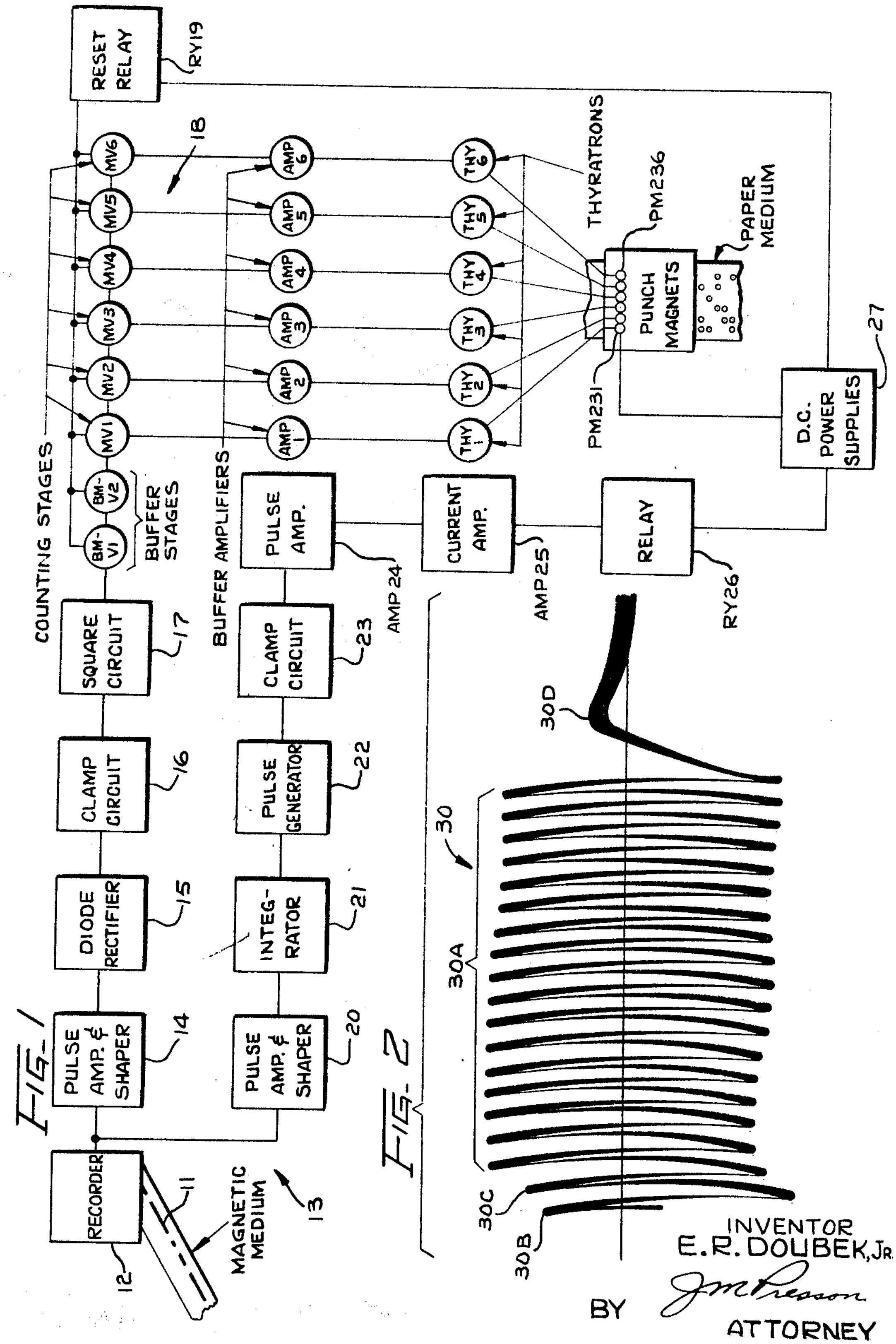
FIG. 1 illustrates the record conversion system in block diagram form.
FIG. 2 shows a typical input signal applied to the record conversion system.

FIG. 1 shows a magnetic tape medium including a single channel of magnetized data bits designated by the numeral 11 which are produced by an equal number of flux changes applied to the magnetic tape. These data bits are preferably recorded in binary form in discrete groupings corresponding to the words or numerals of a desired message to be recorded in encoded form.

Read and playback heads of a recorder 12 convert the magnetized data bits 11 into a series of alternating positive and negative data pulses which are sequentially transmitted to the circuitry of the record conversion system, referred to generally by the numeral 13, the number of data pulses corresponding to the number of information bits on the magnetic tape. The recorder may, for example, be of a type N35B manufactured by the Magnecord Tape Recorder Company.

The system 13 includes a pulse counting circuit comprising a pulse shaping circuit 14, a rectifying circuit 15, a clamping circuit 16, a wave squarer 17, and a binary counter 18. The binary counter 18 may, for example, comprise eight multivibrators BMV1, BMV2, MV1, MV2, MV3, MV4, MV5 and MV6, the first two multivibrators, BMV1 and BMV2, being buffer stages. The six multivibrators MV1–MV6 produce conductive or nonconductive states in amplifiers AMP1, AMP2, AMP3, AMP4, AMP5 and AMP6, and in thyratrons tubes THY1, THY2, THY3, THY4, THY5 and THY6. Punch magnets PM231–PM236 are connected to the outputs of the thyratrons and serve to punch out rows of permutations of holes in a paper tape or card medium presented thereto, the location of the holes in each row corresponding to the binary output of the counter 18.

A second circuit detects interrecord gaps between records on the magnetic tape medium and produces an output pulse when the gap is detected. The interrecord gap detecting circuit includes a pulse shaping circuit 20, an integrating circuit 21, a pulse generating circuit 22, a clamping circuit 23, and amplifiers AMP24 and AMP25.

A relay RY26 is energized by the pulse produced by the interrecord gap detecting circuit and closes contacts that connect a power supply 27 to the punch magnets PM231–PM236. The thyratron tubes THY1–THY6 are conditioned in accordance with the binary output of the counter 18 and fire causing certain of the punch magnets PM231–PM236 to be energized by the power supply 27 to punch a row of holes in the paper medium. The counter 18 is thereafter reset as a result of the relay RY26 energizing a relay RY19, and the inherent inertial delay of the relay RY19 provides a time delay whereby the counter is reset for a predetermined period of time after a record gap is detected.

FIG. 2 illustrates a typical record of data pulses as they might appear in an oscilloscope connected to the output terminals of a commercially available audio quality reading head. The pulses form an information-based input signal 30 of substantially sinusoidal shape which comprises a series of pulses 30*a* of substantially the same amplitude, the pulses 30*a* being generally symmetrical with respect to the X axis. With reference to the initial pulses 30*b* and 30*c* of the input signal 30 it can be seen that these pulses are asymmetrical with respect to the X axis and are displaced from the pulses 30*a* enough so that they probably would not register as counts in the counter. Such pulses would therefore produce what will hereafter be referred to as spurious undercounts, and although these spurious undercount producing pulses may vary in number they have the characteristic of always appearing at the beginning of the input signal and are independent of record length.

It can also be seen that the signal 30 does not terminate abruptly when the particular record ends but decays to form a trailing pulse 30*d* at the end of the signal. Although only one pulse of this type is shown, oftentimes the sinusoidal decay will create more than one of these pulses at the end of the record. It has been observed that this type of pulse is amplified a disproportionate amount by the preamplifiers in the playback heads because of the nonlinear operating characteristic of these amplifiers and because of the differential in frequency between the spurious trailing pulse and the pulses 30*a*. As a result, spurious pulses appearing at the end of the signal 30 will register in the counter as information based pulses and overcounts of one or more data bits can be expected as a consequence.

As will be evident from the hereinafter detailed disclosure of the counter 18, the buffer stages of the counter are designed to absorb predetermined numbers of spurious overcounts and undercounts which result from an imperfect input wave form supplied to the counter by the read head 12.

*Pulse counting circuit*

Referring now to FIG. 3*a*, the pulse shaping circuit 14 is shown in detail as including continuously conducting duotriodes 32 and 33, coupled together by a resistance-capacitance circuit 34, the plate of the triode 32 being connected to a +200 volt D.C. supply $B+1$ through a plate load resistor 36. The grid of the triode 32 is brought out through a grid tap 38 to a resistor 39, the resistor 39 being connected to a conductor 40 from the output of the read head 12.

The plate of the triode 33 is connected to one end of a coil 42 which forms the primary winding of an interstage transformer generally designated by the numeral 43, the other end of the coil 42 having a +200 volt D.C. voltage supply $B+1$ impressed thereon. A secondary coil 49 of the step-up transformer 43 is center tapped to ground by a tap 50, and the ends of the coil 49 are connected to diodes 52 and 53, the diodes 52 and 53 forming the diode rectifier 15 shown in the block diagram of FIG. 1. The function of the diode rectifier is to convert all negative pulses to positive pulses.

The clamping circuit 16 consists of a resistor 54, a diode 55 and a leakage resistor 56 which are connected to the grid of a triode 58 of the squaring circuit 17 and to a conductor 59. The clamping circuit 16 prevents negative leakage through the diodes 52 and 53 from reaching the tube 58, and since the conductor 59 is grounded the voltage level of the grid of the triode 58 will be that of ground potential or slightly positive.

The squarer circuit 17 is also generally known to those working in the art as a Schmitt trigger and since the operation of this type of circuit is known to those skilled in the art it suffices to say that this circuit converts positive input pulses into either equare or rectangular shaped pulses.

To summarize the operation of the pulse counting circuit, data pulses received from the read head 12 by the pulse shaping circuit 14 are amplified and shaped into a series of alternate positive and negative peaks as shown in FIG. 7. The pulses pass through the interstage transformer 43 and the diode rectifier 15 which converts the negative peaks to positive peaks so that the input data signal now contains an equal number of pulses, but the pulses are all positive in value. The diode 55 in the clamping circuit 16 shunts any negative pulses which may result from improper functioning of the rectifier 15 to ground through the conductor 59, positive pulses only biasing the grid of the triode 58 in the wave squarer 17. The squarer 17 converts the peak pulses into positive and negative pulses of rectangular shape, the negative pulses flipping the multivibrators of the counter 18 from 0 to 1 binary states.

Referring now to the lower half of FIG. 3*b*, the bistable multivibrators, BMV1, BMV2, MV1–MV6 (also referred to as "flip-flops" by those working in the art) are provided to convert negative input pulses from the trigger circuit 17 to binary output signals. Since all multivibrator stages are identical, only the multivibrators BMV1 and BMV2 need to be discussed in detail. The various input, output and reset pins for each multivibrator stage are referred to by identical numerals followed by letters which designate all pins common to that particular stage.

The multivibrator BMV1 is bistable, that is, it is stable in either of two possible states, and includes the twin triodes 78 and 79, the plate output of the first triode 78 being coupled by a voltage divider to the grid of the second triode 79, the plate of the second triode being similarly coupled to the grid of the first triode. Pins 182 and 181 are connected to the conductors 59 and 64, respectively. The pin 181 is made positive with respect to the pin 182 by the +200 volt D.C. source *B*+1 connection to the conductor 64 and a pin 184 is connected to a reset line 81 which is connected to the contacts of a normally closed single throw-double pole switch SW10. Normally, the reset line 81 is grounded through the closed switch SW10 and ground is removed from the reset line 81 when the switch SW10 is opened as a result of the reset relay RY19 being energized by a pulse from the interrecord gap detecting circuit to be described subsequently in detail.

The multivibrators forming the counter 18 have two outputs depending upon which triode is conducting and, with reference to the multivibrator BMV1, if it is assumed that the triode 78, that is, the left tube of the multivibrator, is conducting, a significant voltage drop will appear across the plate resistor 82 causing the potential at the plate of the triode 78 to drop to a lower voltage level. This low voltage is applied to the grid of the triode 79, that is, the right tube of the multivibrator, through the coupling resistor 83, the values of the resistors 82 and 83 and the cathode resistor being chosen such that when the triode 78 is conducting, the voltage impressed upon the grid of the triode 79 is rendered sufficiently negative to cut off conduction from this triode.

Since the triode 79 is rendered nonconductive, the plate voltage will be high, and little current will flow through the plate resistor 86 causing the grid of the triode 78 to become more positive, and the triode 78 to remain conducting.

The multivibrator will undergo a change of state when a negative pulse is received by the input pin 185 from the trigger circuit 17. The pulse will be received by the grid of the triode 78, causing the voltage of the grid to drop, causing less current to flow through the triode 78 and through the plate resistor 82. The plate voltage of the triode 78 will rise as a result and this rise in voltage will be coupled to the grid of the triode 79 by the capacitor 87. When the grid of the triode 79 rises above the cutoff point, the triode 79 will begin to conduct and the plate voltage of that triode will drop. The voltage drop so produced will be coupled to the grid of the triode 78 by a capacitor 88, causing the triode 78 to become less conductive. This process is regenerative and, as will be apparent to those skilled in the art, continues until the other stable state is reached where the triode 78 is rendered nonconducting and the triode 79 is rendered conductive.

The following convention has been established for the multivibrator stages: (1) When the voltage at the output pin 187 is relatively high with respect to voltage at the output pin 186, the multivibrator is representing the binary digit 1. (2) When the voltage at the output pin 186 is high with regard to the voltage at the pin 187, the multivibrator represents the binary digit 0. Thus, when the left side of the multivibrator is conducting and the right side is cut off, the multivibrator represents the binary digit 1, whereas when the left side is cut off and the right side conducts, the binary digit 0 is being represented.

The reset pin 184 is normally grounded through the reset line 81 and when it is desired to reset all stages of the counter 18 the relay RY19 is energized so that contacts of the switch SW10 are opened and ground taken off the reset pins. If the left side of the multivibrator is conducting at that time, it will immediately cease conducting since the grid of the tube on the right side of the multivibrator will be driven positive and the tube will conduct. Therefore, the left side will be cut off and the right side will start conducting which represents the 0 state. If the left side is not conducting and the right side is conducting, the removal of the ground from the reset pin 184 will have no effect on the right side and consequently the multivibrator will remain in the 0 state.

Negative pulses are delivered to the grids of the multivibrators since the grids are more sensitive to negative pulses than positive pulses.

The outputs of the left sides of the two multivibrators BMV1 and BMV2, respectively, are shown to be open for purposes of illustrating the principles of this invention since the purpose of the multivibrators BMV1 and BMV2 is not to fire thyratrons in the punch magnet circuit but rather to absorb spurious undercounts and overcounts which arise from imperfect input data signals as discussed generally hereinabove.

The plates of the tubes on the right sides of each multivibrator are connected to the input pins 185B–185G corresponding to the input pins 185 and 185A of the multivibrators BMV1 and BMV2, and the plate outputs of the left sides of the multivibrators MV1–MV6 are taken from the output pins 186B–186G and impressed, FIG. 3*c*, to the grids of the amplifiers AMP1–AMP6 through resistors 91–96 by means of conductors 111–116. The resistors R91–R96 are also connected to a conductor 97 having impressed thereon a −150 volt D.C. source and the plates of the amplifiers AMP1–AMP6 are resistively connected to a conductor 98 having impressed thereon voltage from the *B*+1 source. The grid taps 121–126 of the amplifiers AMP1–AMP6 are positioned with respect to their respective resistors R91–R96 such that the amplifiers are normally in the conductive state and may be rendered nonconductive as a result of the grids thereof being biased more negatively by a negative voltage signal received from the multivibrator corresponding thereto.

The plates of the amplifiers AMP1–AMP6 are connected to respective grids of the thyratrons THY1–THY6 through the resistors R101–R106, which are tapped by grid taps 131–136. The plates of the thyratrons THY1–THY6 are respectively connected to one end of each of coils 141–146 of the punch magnets PM231–PM236, the other ends of the coils 141–146 being connected to the +200 volt D.C. source *B*+2. The resistors R101–R106 are connected to the −150 volt D.C. source of biasing voltage and are tapped along the length thereof by the grid taps 131–136 such that the grids of the thyratrons are normally biased negatively, and the tubes are thereby rendered normally nonconductive.

The characteristics of thyratron type tubes are that the tubes are rendered normally nonconductive by negative bias applied to the control grids thereof and remain nonconductive until the control grids of the thyratrons are conditioned to overcome the normal impressed grid bias voltage, whereupon the tubes become conductive. Once the tubes are rendered conductive the control grids provide no further control over tube operation.

The grid taps 131–136 of the thyratrons THY1–THY6 are positioned with respect to the resistors R101–R106 such that when the plates of the amplifiers AMP1–AMP6 become more positive as a result of the amplifiers being rendered nonconductive, the grids of the thyratrons become more positive and the thyratrons are thusly made conductive. When the amplifiers AMP1–AMP6 are in the conductive state, the plates of the amplifiers AMP1–AMP6 go more negative causing the grids of the thyratrons to become more negative and the thyratrons are conditioned to the nonconductive.

The isolation amplifiers AMP1–AMP6 are positioned between the punch magnets PM231–PM236 and the counter 18 so that signals which might possibly feed back from the punching operation will not pass through the amplifiers AMP1–AMP6 and effect the counter stages. The coils 141–146 of the punch magnets PM231–PM236 are selectively connected to, and disconnected from, the positive side of the source 27 by actuation of the relay RY26.

*Relays for energizing the punch magnets and resetting the counter*

Referring again to FIG. 3*b*, the relay RY26 is energized by a pulse from the interrecord gap detecting circuit to be described in detail hereinafter, and includes two capacitors 200 and 201 and a coil 202 connected to form a conventional $\pi$ filter network. The $\pi$ network is connected to the negative side of a 200 volt D.C. source $B+2$. A capacitor 204 is connected to the negative side of the source and to ground, the capacitor 204 serving to bypass alternating current transients that may be produced by contact bounce in the contacts of the single throw-double pole switch SW11. The switch SW11 is normally open so that ground is normally taken off the negative side of the $B+2$ source and therefore no voltage is received by the plates of the thyratrons THY1–THY6, the plates of the thyratrons being connected to the positive terminal of $B+2$ through the coils 141–146 of the punch magnets PM231–PM236. Since the cathodes of the thyratrons THY1–THY6 are grounded, only the negative terminal of the source $B+2$ need be grounded in order to condition the thyratrons for firing. The grounding of the negative side of the $B+2$ source is effected by the relay RY26 being energized by a pulse from the interrecord gap circuit and subsequent closing of the contacts of the switch SW11.

The signal which causes energization of the relay RY26 is only a pulse of short time duration, and the relay is consequently only momentarily energized. Upon deenergization thereof the thyratron plate voltage is removed from the thyratrons and conduction ceases. This brief energization of the thyratrons is sufficient, however, since the punch magnets PM231–PM236 are provided with conventional clutches (not shown) which lock in for one complete punching cycle as soon as certain of the thyratrons fire. At the end of the punching cycle the clutches release and the punch magnets are again conditioned for another punching operation.

The coil of the relay RY19 is also connected to the positive terminal of the source $B+2$ and is energized by closure of the switch SW11 resulting from the pulse which energizes the relay RY26. As discussed hereinabove, energization of the relay RY19 opens the normally closed contacts of the switch SW10. The relay RY19 has an inherent inertial delay after receiving the pulse from the source $B+2$ of approximately five milliseconds and thus opens the normally closed switch SW10 approximately five milliseconds after the switch SW11 is closed. The relay RY19 may, for example, be of a type manufactured by the Western Electric Company and designated as WE275B.

The switch SW10 therefore remains closed for a short interval of time while the source $B+2$ is applied to condition the thyratrons for firing in accordance with the binary output applied thereto by the multivibrators. When the switch SW10 opens, the counter 18 is reset by the removal of ground from the reset line 81 and the inherent 5 millisecond in the closing of the relay RY19 ensures that the multivibrators will be maintained in the reset state during a short interval of time when transients developed by the collapsing of the punch magnet fields are being dissipated in the punches and thyratron circuit. The counter 18 is set up to count the pulses in the next record when ground is reapplied to the reset line 81 by subsequent closure of the switch SW10.

*Interrecord gap detecting circuit*

Referring again to FIG. 3*a*, the interrecord gap detecting circuit includes a pulse shaping circuit 20 which receives the output signal from the read head 12 and comprises normally conducting duo-triodes 210 and 212, the plate of the triode 210 being coupled to the grid of the triode 212 by a resistance-capacitance circuit indicated generally by the numeral 213. The triodes 210 and 212 are preferably overdriven to effect positive clipping (or shaping) of the incoming pulse train so as to provide more reliable cancelling of the positive pulses by subsequent circuitry described hereinbelow. The triodes in conjunction with capacitor 213, also results in circuit 20 functioning as a high pass filter. As such, this circuit is capable of discriminating not only between negative and positive pulses (by the aforementioned partial positive pulse clipping), but also between pulses exhibiting primarily high frequency components (such as the pulses 30B and 30C of the encoded pulse train depicted in FIG. 2) versus undesirable pulses exhibiting primarily low frequency components (such as pulse 30D at the trailing end of the pulse train of FIG. 2). It should also be pointed out that in practice, generally, pulse amplitude cannot be relied upon to differentiate between pulses of the type depicted by 30B and 30D of FIG. 2 as the latter type of pulse may often times be larger in amplitude than the initial pulse which may actually form a part of an encoded message. The circuit 20 amplifies and shapes pulses received from the read head 12. The grid of the triode 210 is brought out through a grid tap 215 to a resistor 216 connected to the conductor 40, and the plate resistances 217 and 218 of the triodes 210 and 212, respectively, are connected to the +200 volt D.C. $B+1$ supply. The cathode of the triode 210 is connected to a resistor 219, to the grounded conductor 220 and to the cathode of the triode 212. The plate resistance of the triode 212 is connected to a capacitor 222, to a diode 223 and to the integrating circuit 21 which includes a resistor 224 and a capacitor 225 connected in parallel. The integrating circuit 21 essentially integrates the pulses received so that the desired charge can be produced even though there may be fluctuations in the magnitudes of the individual input pulses.

The grid of the pulse generator 22 is connected to the negative side of the capacitor 225, the plate resistance 226 of the pulse generator 22 being connected to the $B+1$ source, to a capacitor 227, and to the clamping circuit 23. The clamping circuit 23 includes a diode 229 and a resistor 230 connected across the grid and cathode of a pulse amplifier 231. The plate resistance 232 of the amplifier 231 is connected to the $B+1$ source, to a capacitor 233, to a resistor 234 and to the grid of a current amplifier 235. The plate of the current amplifier 235 is connected to one end of the coil 240, FIG. 3B, forming the relay RY26, the other end of the coil 240 also being connected to the $B+1$ source. The cathode of the amplifier 235 is connected to a resistor 236 and to the grounded conductor 220.

The interrecord gap sensing circuit receives positive and negative pulses from the read and playback heads 12 simultaneously with the pulse counting circuit previously described. The diode 223, however, prevents passage of the positive pulses and the grid tap 215 is positioned with respect to the resistor 216 such that negative pulses cause the grid of the triode 210 to become more negative so that the triode 210 becomes less conductive. As a result of the triode 210 conducting less, the plate voltage of that tube rises causing the grid of the triode 212 to become more positive so that the triode 212 becomes more conductive. As the triode 212 becomes more conductive, the capacitor 222 discharges and the capacitor 225 charges, the charge gradually building up on the capacitor 225 as additional pulses are received and the capacitor 225 charges in the path indicated by the arrow, causing the grid of the pulse generator 22 to become more negative so that the pulse generator 22 becomes less conductive. As the pulse generator 22 conducts less, the plate voltage rises, the capacitor 227 charges and the diode 229 causes positive pulses to be shorted to ground through the conductor 220 so that the grid of the pulse amplifier 231 is maintained at essentially ground potential or slightly above ground potential depending upon the value of the small voltage drop across the diode 229 and the amplifier 231 is thereby rendered more conductive. As the tube 231 becomes more conductive, the plate voltage drops so that the capacitor 233 discharges and the grid of the amplifier 235 goes more negative. The value of the resistor 236 is chosen such that in the absence of an input signal the voltage drop which occurs across the resistor 236 when the triode 231 conducts reduces the conductivity of the triode 235 below that required to energize the relay RY26.

In the absence of negative pulses in an interrecord gap, the triode 210 will be more positively biased, so that the triode 210 becomes more conductive, the triode 212 becomes less conductive so that the charge on the capacitor 225 is allowed to discharge through the resistor 224 causing the grid of the pulse generator 22 to become more positive. The pulse generator 22 discharges capacitor 227 which generates a negative active pulse on the grid of the tube 231. Charging current passing through the resistor 234 drives the grid of the triode 235 to a more positive value so that the triode 235 conducts a surge of current from the plate sufficient to operate the relay RY26, FIG. 8. Thus, in the absence of pulses the relay RY26 is momentarily energized by the interrecord gap detecting circuit. The relay RY26 is not energized when pulses are received from the read head 12 for reasons set forth hereinabove.

*Operation of the buffer multivibrator stages*

To reiterate, the counter 18 comprises at least one buffer stage and a plurality of counting stages, the latter stages supplying binary outputs to fire certain of the thyratrons which thyratrons provide discharge paths from a source of voltage through the coils of certain of the punch magnets, whereby the punches are energized to punch a row of holes in the paper medium in accordance with the bias applied to the grids of the thyratrons.

With reference to FIG. 2 and with the previous discussion related thereto, the buffer stage or stages are counting stages which are not connected to condition the thyratrons for firing and by the operation of the buffer stage or stages a certain number of overcounts and undercounts will not register as data bit information on the paper medium. A sampling taken of numbers as represented by each row of holes in the punched card medium and compared to the number of data bits actually read into the computer to create the record on the magnetic tape medium will determine the number of overcounts or undercounts which result when the data bit information on the magnetic tape is converted to punched holes on the paper medium. To reiterate, such spurious counts are produced by the preamplifiers and playback heads in the recorder 12 and are not produced in the pulse counting circuit. The frequencies of overcounts and undercounts can be plotted, a typical distribution curve being illustrated in FIG. 5. It has been observed that typical distribution curves so plotted are bilaterally symmetrical or at least approximate a bilateral symmetrical configuration sufficiently to be regarded as being "normal distribution curves" as these curves are known to those working in the art of statistics.

A typical normal distribution curve is shown in FIG. 4, such curves providing a practical means for representing the probable error distribution in any sample taken from the same machine. Since the curve is symmetrical or substantially symmetrical, the arithmetic mean of all overcounts and undercounts can be represented by the midpoint O. The horizontal distances from the mean to a point of inflection on the normal curve is defined as a standard deviation $\sigma$. Mathematically, the point of inflection is defined as that point where the second derivative of the equation of the normal curve changes sign and is equal to the square root of the arithmetic mean of the squares of the individual deviations. If the points of inflection are projected perpendicularly onto the base line X—X, they will intersect at $\sigma$ and $-\sigma$ and the curve and the two perpendicular lines and the base line X—X will enclose approximately 68% of the entire area under the curve.

These perpendicular lines, also known as limit lines, are erected at distances $2\sigma$ and $-2\sigma$, that is, twice this distance from either side of the mean, and will, together with the base line and the curve, enclose approximately 96% of the area of the curve. When the limit lines are erected at distances which are $3\sigma$ and $-3\sigma$, the area enclosed by the curve and the perpendiculars will be approximately 99.7% of the total area of the curve.

The percentage of the area enclosed by any pair of limit lines under a normal curve will determine the probability that this percentage of values will fall between these limits. Standard tables are available which will establish the percentage of the total area which will fall within a given fraction or multiple of the value of the standard deviation $\sigma$. Conversely, it is also possible to determine limits as a fraction or multiple of the standard deviation $\sigma$ whereby a predetermined percentage of the total number of counts can be relied upon to fall within those limits. Thus, it is possible to define count limits that will establish with a high degree of confidence the probability of a certain number of overcounts or undercounts resulting from every record conversion. Once the number of overcounts or undercounts needed to attain the desired probability is determined, the buffer stage or stages of the counter 18 can be set up such that they will absorb this number of overcounts and undercounts to provide the desired accuracy in the counting stages MV1–MV6.

The count absorption limits in each buffer stage can be established in accordance with the count frequency distribution curve of the particular conversion system and the number of buffer stages required to completely absorb these counts must be determined. Each multivibrator must be flipped from the 0 to the 1 state and back to the 0 state before a succeeding multivibrator to which it is connected will be flipped from the 0 to the 1 state. The number of overcounts or undercounts which must be absorbed by the buffer stage without flipping the higher order counting stages determines the number of buffer stages required. The capacity of the buffer stages must be equal to the maximum number of overcounts plus the maximum number of undercounts anticipated and this capacity can be expressed as $(2^n)-1$, where $n$ is the number of buffer stages. Since the number of overcounts and undercounts necessary to provide the desired reliability will be known from the frequency distribution curve, the value $n$ can be ascertained.

For example, a typical count distribution curve when plotted may appear as the curve shown in FIG. 5. Since this curve is approximately the same shape as the normal curve illustrated in FIG. 4, the desired confidence limits can be determined to be between certain numbers of overcounts and undercounts. Assume, for example that the probability of each record containing between two undercounts and one overcount will be very great and thus two undercounts and one overcount should be absorbed by the buffer stages to achieve the desired accuracy of count. Applying the above equation, the number of buffer stages required to absorb the two undercounts and one overcount will be two.

After the number of buffer stages are determined the computer which produced the magnetic tape must be programmed to increase the number of bits to compensate for count division created by action of the buffer stages. More specifically, for each buffer stage added, the total number of programmed data bits recorded on the magnetic tape (exclusive of those for compensating for overcounts and undercounts) must be doubled to produce a corresponding read out by the actual counting stages of the counter. Thus, for purposes of comparison, an input signal comprising 100 pulses applied to a conventional counter would have to be increased to 200 pulses for one buffer stage, 400 pulses for two buffer stages, etc. (exclusive of any compensating pulses), in order to provide the same counter read out.

The relationship between computer output, counter output and the number of buffer stages employed can be expressed as follows: the number of data bits on the magnetic tape required to produce $X$ number of data bits in the counter$=X$ number of data bits $(2^n)+$the number of undercounts to be absorbed; where $n$ equals the number of buffer stages.

In accordance with the above equation, it is possible to program the computer to deliver the correct number of data bits for any particular set of buffer absorption limits. Following the previous example, since two buffer stages will absorb two undercounts and one overcount, if 100 data bits are to be produced by the counter the number of data bits which must be programmed into the computer producing the magnetic tape will have to be 402.

Although spurious counts over the buffer absorption limits will appear as erroneous counts in the higher order counting stages, the percentile error caused by such counts will be less than it would be were the buffer stages not incorporated into the counter. Also as mentioned above such spurious counts appear only at the beginning and end of each record and thus the probability of their being a certain number of overcounts or undercounts will not vary even though the length of each record varies.

*Perfect record counting circuit*

In some instances, it may be desirable to count the number of perfect records, that is, the number of records having no overcounts or undercounts in them. For this purpose the circuit illustrated in FIG. 6 and referred to by the numeral 300 can be used.

Assume for the sake of illustrating the operation of the circuit 300 that two buffer stages are incorporated to absorb the two spurious undercounts and one overcount. The output pins 186 and 186A of the multivibrators BMV1 and BMV2 are connected to the circuit 300 that comprises the duo-triodes 301 and 302, the grids of the triodes 301 and 302 being brought out to grid taps 303 and 304, respectively, which tap off the resistors 306 and 307. The cathodes of the triodes 301 and 302 are grounded and the triode plates are connected through plate load resistors 309 and 310 to the $B+1$ source. The resistors 306 and 307 are connected to the −150 volt D.C. bias source. The grid taps 303 and 304 are positioned with respect to the resistors 306 and 307, such that the triodes 301 and 302 are rendered normally conductive and each tube can be rendered nonconductive by a change of state of the multivibrator connected thereto.

The plates of the triodes 301 and 302 are connected through pins 312 and 313 and pins 314 and 315 to the grids of pentodes PT10 and PT11 respectively, the grids of the tubes PT10 and PT11 being tapped by grid taps 316 and 317 to resistors 318 and 319. The grid taps 316 and 317 are positioned with respect to resistors 318 and 319 such that the tubes PT10 and PT11 are rendered normally nonconductive by continuous conduction from the tubes 301 and 302. The cathodes of the tubes PT10 and PT11 are grounded and the plates of the tubes are respectively connected to current limiting resistors 320 and 321 and to the coils 324 and 325 of the relays RY326 and RY327.

The relays RY326 and RY327 are designed to open the contacts of normally closed switches SW13 and SW14 upon energization thereof. The contact K328 of the switch SW13 is normally connected to the grounded contact K329 of the switch SW14 and the contact W330 of the switch SW14 is connected to the input terminal of a conventional single step mechanical counter referred to generally by the numeral 332 which can be sequentially stepped by electrical pulses applied to the input thereof to count the number of pulses received thereby. The contact K328 is connected to a current limiting resistor 333 which is connected to the cathode of a glow tube 334. A variable resistor 336 is connected to a conductor 337 and to the counter 332 when the contacts 328 and K330 are closed. The resistance of the resistor 336 can be adjusted to insure proper voltage and current inputs to the counter 332. The conductor 337 is connected to the positive terminal of the $B+2$ source (FIG. 3A) so that the circuit 300 is only energized when the relay RY26 is energized, that is, where there is an interrecord gap in a record on the magnetic tape.

By reference to the chart shown below, the circuit 300 is designed such that when the 0–1 states occur and the relay RY26 is energized by the interrecord gap detecting circuit, the glow tube 334 will light and the switches to the counter 332 will close, and the counter 332 will be stepped once for each perfect record, that is, a record having neither an undercount nor an overcount present therein.

Those skilled in the art will be able to design equivalent circuits required for other established undercount and overcount limits.

It is to be understood that the above-described arrangements are simply illustrative of the application of the principles of this invention. Numerous other arrange-

STATE OF—

| BMV1 | BMV2 | Tube 301 | Tube PT10 | Switch SW13 | Tube 302 | Tube PT11 | Switch SW14 | Glow Tube 334 | Counter 332 |
|---|---|---|---|---|---|---|---|---|---|
| 0 | 0 | C | NC | Open | C | NC | Open | Off | Not energized. |
| 1 | 1 | NC | C | Closed | NC | C | Closed | Off | Not energized. |
| 1 | 0 | NC | C | Closed | C | NC | Closed | Off | Not energized. |
| 0 | 1 | C | NC | Open | NC | C | Closed | On | Energized to count a perfect record. |

C means conductive—NC means nonconductive.

ments may be readily devised by those skilled in the art which will embody the principles of the invention and fall within the spirit and scope thereof.

What is claimed is:

1. A binary counting circuit for counting electrical pulses forming an input signal applied thereto which comprises:

a counter having a plurality of counting stages connected in series for counting the pulses forming the input signal and producing binary encoded output signals representative of the number of pulses counted, at least the lowest order counting stage serving as a buffer stage responsive to spurious pulses of the type indicative of overcounts and undercounts and effective to absorb at least one of said spurious pulses whenever accompanying the desired pulses representative of said input signal; and a utilization device connected to the outputs of all the counting stages other than the buffer stage for utilizing the binary encoded outputs of those counting stages.

2. A binary counting circuit for counting electrical pulses forming an input signal applied thereto which comprises:

a counter having a plurality of counting stages connected in series for counting the pulses forming the input signal and producing binary encoded output signals representative of the number of pulses counted, at least the lowest order counting stage serving as a buffer stage responsive to spurious pulses of the type indicative of overcounts and undercounts and effective to absorb at least one of said spurious pulses whenever accompanying the desired pulses representative of said input signal;

a utilization device connected to the outputs of all the counting stages other than the buffer stage for utilizing the binary encoded outputs of these counting stages; and reset means energizable to reset all stages of said counter and including electrical pulse storage means for receiving and storing pulses of the input signal, said storage means discharging to energize said reset means upon termination of the input signal whereupon said counter is reset.

3. A binary counting circuit for counting electrical pulses forming an input signal applied thereto which comprises:

a counter having a plurality of counting stages connected in series for counting the pulses forming the input signal and producing binary encoded output signals representative of the number of pulses counted, at least the lowest order counting stage serving as a buffer stage responsive to spurious pulses of the type indicative of overcounts and undercounts and effective to absorb at least one of said spurious pulses whenever accompanying the desired pulses representative of said input signal;

a utilization device connected to the outputs of all the counting stages other than the buffer stage for utilizing the binary encoded outputs of these counting stages; and means for counting the number of perfect signals having neither a pulse overcount nor an undercount therein.

4. A binary counting circuit for counting electrical pulses forming an input signal applied thereto which comprises:

a counter having a plurality of counting stages connected in series for counting the pulses forming the input signal and producing binary encoded output signals representative of the number of pulses counted, at least the lowest order counting stage serving as a buffer stage responsive to spurious pulses of the type indicative of overcounts and undercounts and effective to absorb at least one of said spurious pulses whenever accompanying the desired pulses representative of said input signal;

a utilization device connected to the outputs of all the counting stages other than the buffer stage for utilizing the binary encoded outputs of those counting stages;

reset means energizable to reset all stages of said counter and including electrical pulse storage means for receiving and storing pulses of the input signal, said storage means discharging to energize said reset means upon termination of the input signal whereupon said counter is reset; and means for counting the number of input signals having neither an overcount nor an undercount therein.

5. In combination:

a binary counter circuit;

an interrecord gap detecting circuit for detecting interrecord gaps between records of positive and negative data bit pulses supplied to the counter circuit, said interrecord gap detecting circuit comprising:

means for amplifying and shaping the positive and negative pulses in each record, and for discriminating between data pulses primarily exhibiting high versus low frequency components by blocking any pulses exhibiting low frequency components;

means connected to the pulse amplifying and shaping means for preventing passage of shaped positive pulses;

capacitor means in the circuit with said means for preventing passage of the positive pulses for storing negative pulses supplied thereto, said capacitor means discharging when the flow of negative pulses is interrupted by an interrecord gap; and reset means responsive to the discharging of said capacitor means and electrically connected to said counter circuit for resetting all stages of the counter circuit, whereby said reset means is energized upon termination of the input signal to reset the counter circuit.

6. In combination:

a binary counter circuit;

an interrecord gap detecting circuit for detecting interrecord gaps between records of positive and negative data bit pulses supplied to the counter circuit, said interrecord gap detecting circuit comprising:

means for amplifying and shaping the positive and negative pulses in each record and for discriminating between data pulses primarily exhibiting high versus low frequency components by blocking any pulses exhibiting low frequency components;

means connected to the pulse amplifying and shaping means for preventing passage of shaped positive pulses;

capacitor means in the circuit with said means for preventing passage to the positive pulses for storing negative pulses supplied thereto, said capacitor means discharging when the flow of negative pulses is interrupted by an interrecord gap;

an electron discharge device connected to said capacitor means, said discharge device being normally nonconductive and being rendered conductive by discharge of said capacitor means; and reset means electrically coupled to and capable of resetting the binary counter circuit upon being energized, said reset means being controlled by said discharge device such that conduction by said discharge device causes energization of said reset means, the absence of negative pulses causing said capacitor means to discharge and render said discharge device conductive so that the binary counter circuit is reset after an interrecord gap is detected.

7. In combination:

a binary counter circuit;

an interrecord gap detecting circuit for detecting interrecord gaps between records of positive and negative data bit pulses supplied to the counter circuit, said interrecord gap detecting circuit comprising:

means for amplifying and shaping the positive and negative pulses in each record and for discriminating between data pulses primarily exhibiting high versus low frequency components, and for blocking pulses exhibiting low frequency components;

means connected to the pulse amplifying and shaping means for preventing passage of shaped positive pulses;

capacitor means in the circuit with said means for preventing passage of the positive pulses for storing negative pulses supplied thereto, said capacitor means discharging when the flow of negative pulses is interrupted by an interrecord gap;

an electron discharge device connected to said capacitor means, said discharge device being normally nonconductive and being rendered conductive by discharge of said capacitor means;

reset means electrically coupled to and capable of resetting the binary counter circuit upon being energized, said reset means being controlled by said discharge device such that conduction by said discharge device causes energization of said reset means; and means connected to said discharge device for providing an impedance sufficient to insure that the conductivity of said discharge device is below that needed to effect energization of said reset means prior to discharge of said capacitor means, the absence of negative pulses causing said capacitor means to discharge and render said electron discharge device conductive so that the binary counter circuit is reset after an interrecord gap is detected.

8. In a record conversion system wherein a magnetic record of data bit information is read out and converted into electrical data pulses, with the data pulses subsequently being converted into binary encoded electrical output pulses for use as control signals to effect selective energization of a plurality of punch devices to punch holes in a paper medium representative of the data bit information originally appearing in the magnetic record:

a counter having a plurality of counting stages connected in series for counting the number of electrical data pulses applied as input signals thereto, and for producing binary encoded output signals representative of the number of data pulses counted, at least the lowest order counting stage serving as a buffer stage responsive to spurious pulses of the type indicative of overcounts and undercounts and effective to absorb at least one of said spurious pulses whenever accompanying the desired data pulses comprising the input signal, and a circuit for detecting the presence of interrecord gaps between records of data bit information in response to said information being converted into electrical data pulses and applied to said circuit as input signals, said circuit including means for storing the last-mentioned pulses and for producing a pulse output sufficient to effect the conditioning of a plurality of punch devices for operation when associated therewith, the binary encoded output control signals from said counting stages thereafter being employed to effect the selective energization of the associated punching devices.

9. In a record conversion system wherein a magnetic record of data bit information is read out and converted into electrical data pulses, with the data pulses subsequently being converted into binary encoded electrical output pulses for use as control signals to effect selective energization of a plurality of punch devices to punch holes in a paper medium representative of the data bit information originally appearing in the magnetic record:

a counter having a plurality of counting stages connected in series for counting the number of electrical data pulses applied as input signals thereto, and for producing binary encoded output signals representative of the number of data pulses counted, at least the lowest order counting stage serving as a buffer stage responsive to spurious pulses of the type indicative of overcounts and undercounts and effective to absorb at least one of said spurious pulses whenever accompanying the desired data pulses comprising the input signal;

a circuit for detecting the presence of interrecord gaps between records of data information in response to said information being converted into electrical data pulses and applied to said circuit as input signals, said circuit including means for storing the last-mentioned pulses and for producing a pulse output sufficient to effect the conditioning of a plurality of punch devices for operation when associated therewith, the binary encoded output control signals from said counting stages thereafter being employed to effect the selective energization of the associated punch devices, and reset circuit means connected to all of said counting stages for resetting said stages upon being actuated, said reset circuit means including electrical pulse storage means for receiving and storing the electrical data pulses, said storage means discharging to actuate said reset circuit means upon termination of the electrical data pulses, whereupon said counter is reset, said reset circuit means having an actuation time delay incorporated therein so that said counter is maintained in the reset state for a predetermined time after said circuit for detecting the presence of interrecord gaps has produced an output pulse.

10. In a record conversion system wherein a magnetic record of data bit information is read out and converted into electrical data pulses, with the data pulses subsequently being converted into binary encoded electrical output pulses for use as control signals to effect selective energization of a plurality of punch devices to punch holes in a paper medium representative of the data bit information originally appearing in the magnetic record:

a counter having a plurality of counting stages connected in series for counting the number of electrical data pulses applied as input signals thereto, and for producing binary encoded output signals representative of the number of data pulses counted, at least the lowest order counting stage serving as a buffer stage responsive to spurious pulses of the type indicative of overcounts and undercounts and effective to absorb at least one of said spurious pulses whenever accompanying the desired data pulses comprisin the input signal;

a circuit for detecting the presence of interrecord gaps between records of data information in response to said information being converted into electrical data pulses and applied to said circuit as input signals, said circuit including means for storing the last-mentioned pulses and for producing a pulse output sufficient to effect the conditioning of a plurality of punch devices for operation when associated therewith, the binary encoded output control signals from said counting stages thereafter being employed to effect the selective energization of the associated punch devices;

reset circuit means connected to all of said counting stages for resetting said stages upon being actuated, said reset circuit means including electrical pulse storage means for receiving and storing the electrical data pulses, said storage means discharging to actuate said reset circuit means upon termination of the electrical data pulses whereupon said counter is reset, said reset circuit means having an actuation time delay incorporated therein so that said counter is maintained in the reset state for a predetermined time after said circuit for detecting the presence of interrecord gaps has produced an output pulse, and a counter connected to the output of said buffer stage for counting the number of perfect records.

11. In a record conversion system wherein signal intelligence initially in a first usable form is converted into a second electrical form comprised of encoded signal pulses, with the encoded signal pulses being at least temporarily stored in the form of corresponding discrete data bits of information impressed as a record in a recording medium, wherein the stored record is subsequently read out into the second form for conversion into a third form of encoded output pulses for use as control signals to effect the operation of utilization devices, and wherein spurious signals of the type indicative of overcounts and undercounts can result from converting the temporarily stored record of data bits into said third form of encoded pulses:

a counted for receiving as an input signal a first series of encoded signal pulses in the second form representative of the data bits of information read out of the stored record, said counter having a plurality of electrically connected counting stages for counting the first series of signal pulses applied thereto, and for producing a second series of encoded output pulses in the third form representative of the number of said first series pulses counted, for utilization as control signals, with at least the lowest order counting stage serving as a buffer stage responsive to spurious pulses of the type indicative of overcounts and undercounts and effective to absorb at least one of the spurious pulses whenever accompanying the desired pulses in the first series comprising the input signal.

References Cited by the Examiner

UNITED STATES PATENTS

| | | | |
|---|---|---|---|
| 2,470,716 | 5/1949 | Overbeck | 235—92 |
| 2,521,787 | 9/1950 | Grosdoff | 235—92 |
| 2,847,565 | 8/1958 | Clapper | 328—120 |
| 2,913,179 | 11/1959 | Gordon | 325—164 |
| 2,960,266 | 11/1960 | Loshing et al. | 235—61.1 |
| 3,072,328 | 1/1963 | Bewley et al. | 235—61.1 |
| 3,141,091 | 7/1964 | Creveling | 235—92 |

ROBERT C. BAILEY, *Primary Examiner.*

MALCOLM MORRISON, *Examiner.*

G. D. SHAW, *Assistant Examiner.*